United States Patent [19]

Kisanuki

[11] Patent Number: 4,817,336
[45] Date of Patent: Apr. 4, 1989

[54] GLASS RUN CONNECTING CORNER PIECE

[75] Inventor: Hisayuki Kisanuki, Aichi, Japan

[73] Assignee: Toyoda Gosei Co., Ltd., Nishikasugai, Japan

[21] Appl. No.: 199,768

[22] Filed: May 27, 1988

[30] Foreign Application Priority Data

May 30, 1987 [JP] Japan ............................ 62-84973[U]
May 30, 1987 [JP] Japan ............................ 62-84974[U]

[51] Int. Cl.$^4$ .............................................. E06B 7/16
[52] U.S. Cl. ....................................... 49/476; 49/479; 296/154
[58] Field of Search ................. 49/440, 441, 476, 479; 296/213, 154

[56] References Cited

U.S. PATENT DOCUMENTS

| | | | |
|---|---|---|---|
| 1,592,466 | 7/1926 | Morgan | 49/476 |
| 2,922,675 | 1/1960 | Wernig | 49/476 |
| 4,475,766 | 10/1984 | McKee | 49/476 |
| 4,494,790 | 1/1985 | Omura | 49/476 |
| 4,616,447 | 10/1986 | Okamoto | 49/479 |

Primary Examiner—Kenneth J. Dorner
Assistant Examiner—Gerald Anderson
Attorney, Agent, or Firm—Cushman, Darby & Cushman

[57] ABSTRACT

A seal for a sliding window glass, in particular a connecting corner piece for connecting a inner seal for a lower edge of a door window frame to a glass run seal. The glass run seal having a base fixed to the window frame, and a hollow seal portion for sealing contact with the inner surface of the door glass and for forming a water escape. The glass run, lower edge, inner seal having another base fixed to the window frame and a first upright seal extending from an upper edge of the base, and a second seal portion upright from a lower edge of the base positioned to form a water escape. The glass run connecting corner piece comprising a longitudinal portion having the same cross-sectional shape as that of the glass run seal and connected thereto, and a transverse portion having the same cross-sectional shape as that of the glass run, lower edge, inner seal and connected thereto. The interconnection of the glass run seal and inner seal by the corner piece resulting in the water escape of the longitudinal portion communicated with the water escape of the transverse portion.

4 Claims, 3 Drawing Sheets

GLASS RUN CONNECTING CORNER PIECE

BACKGROUND OF THE INVENTION

The present invention relates to a glass run connecting corner piece provided in a window frame of a vehicle, and more particularly, relates to a glass run connecting corner piece which is suited for preventing occurrence of wind whistling and penetration of rainwater indoors during running of a vehicle at a high speed.

Glass runs are classified into those arranged at upper and lower edges of a window frame respectively, which are different in cross-sectional shape from each other. For example, the glass run 1 for the upper edge of the window frame (hereinafter referred to as "upper edge glass run") and the glass run 15 for the lower edge of the window frame (hereinafter referred to as "lower edge glass run") are arranged in such a manner as shown in FIGS. 1 and 2, respectively.

The upper edge glass run 1 has a base portion 3, a hollow seal portion 5 and a bent lip portion 7. The base portion 3 is formed of solid rubber and fitted into a U-shaped portion of a window frame (door sash) 9. The hollow seal portion 5 has a seal wall 11 and a stopper wall 12 which are formed of foam rubber. An edge portion of door glass G abuts against the seal wall 11 to thereby prevent the penetration of rainwater indoors from the outside of the vehicle and the suction of indoor air to the outside of the same (which may be a cause of wind whistling) during running of the vehicle at a high speed.

The bent lip portion 7 protrudes from the base portion 3 with a predetermined separation from the hollow seal portion 5. The bent lip portion 7 coming into contact with the inner surface of the door glass G is bent so that its free end is involved inward (toward the base portion 3) in the direction of the arrow of FIG. 1. Here, repulsive force is generated to clamp the door glass G between the bent lip portion 7 and the stopper wall 12, so that the position of the door glass G is stabilized relative to the seal wall 11 to secure the sealing property between the door glass G and the seal wall 12. Of course, the bent lip portion 7 has a sub-sealing effect. A groove surrounded by the base portion 3 and the bent lip portion 7 serves as a water escape 13 of rainwater or the like. When the door glass G is opened or when the seal wall 11 is fatigued, the water escape 13 traps rainwater or the like entering indoors and guides it downward.

The lower edge glass run 15 is composed of a lower edge glass run inner 17 and a lower edge glass run outer 19 as shown in FIG. 2. The lower edge glass run inner 17 has a base portion 23, a first seal portion 25 and a second seal portion 27. The base portion 23 is fitted into a fastening portion of the window frame (the inner assembly of the door panel) 21. The first and second seal portions 25 and 27, which are belt-like members, are connected to the upper edge and the lower edge of the base portion 23, respectively. The free ends of the seal portions 25 and 27 come into contact with the inner surface of the door glass G mainly to prevent the suction of indoor air to the outside of the vehicle. A groove surrounded by the first seal portion 25, the base portion 23 and the second seal portion 27 serves as a water escape 29 to guide the water of the water escape 13 of the upper edge glass run 1 to a scupper 30 as shown in FIG. 3.

Also the lower edge glass outer 19 has a base portion 33 and two seal portions 35 and 37. The lower edge glass outer 19 is mounted to the window frame (the outer assembly of the door panel) 32 by a clip 31. The seal portions 35 and 37 mainly prevent the penetration of rainwater or the like indoors from the outside of the vehicle.

The upper edge glass run 1 and the lower edge glass run inner 17 will be described more in detail hereunder in connection of the field of the invention (prevention of occurrence of wind whistling and penetration of rainwater indoors during running of the vehicle at a high speed) which is described above at the beginning of this specification.

The upper edge glass run 1 and the lower edge glass run inner 17 are separately formed by extrusion and mounted onto the upper edge and the lower edge of the window frame of the door, respectively, so that the glass run 1 and the glass run inner 17 are connected to each other by abutment (without sticking) at opposite ends (corner portions) of the lower edge of the window frame. FIG. 1 shows an example of connection of the glass run 1 and the glass run inner 17 at a position A shown in FIG. 3. In FIG. 1., an end portion of the upper edge glass run 1 is put on the base portion 23 of the lower edge glass run inner 17 in order to make the water escape 13 of the upper edge glass run 1 communicate with the water escape 29 of the lower edge glass run inner 17. Here, a lower end of the hollow seal portion 5 of the upper edge glass run 1 (coming into contact with the lower glass run inner 17) is partly cut so that the second seal portion 27 of the lower edge glass run inner 17 can be bent along the door glass G in the direction of the whitish arrow of FIG. 1. On the other hand, a top end of the first seal portion 25 of the lower edge glass run inner 17 (coming into contact with the upper edge glass run 1) is partly cut so that the first seal portion 25 and the bent lip portion 7 can be bent respectively in the directions of the whitish and blackish arrows of FIG. 1, as a result of which the first seal portion 25 is prevented from interfering with the bent lip portion 7.

The structure of connection between the upper edge glass run 1 and the lower edge glass run inner 17 as shown in FIG. 1, however, has a disadvantage in that a space S may arise between the bent lip portion 7 and the first seal portion 25 because of variations in size of each door assembly. Although the first seal portion 25 has the function of preventing the occurrence of wind whistling, the function becomes ineffective in the presence of such a space S because indoor air is sucked from the space S to the outside during running of the vehicle at a high speed.

Further, rainwater or the like which must be exhausted from the water escapes 13 and 29 may be leaked from the space S to the inside of the vehicle.

The aforementioned disadvantage may be eliminated by an improvement in assembling accuracy of the glass runs. However, the assembling work for such an improvement requires much time, undesirably.

Furthermore, it may be considered that the space S is blocked by sticking the bent lip portion 7 of the upper edge glass run 1 to the first seal portion 25 of the lower edge glass run inner 17 with the upper edge glass run 1 being bent substantially perpendicularly along the corner portion of the window frame (for example, as disclosed in Japanese Patent Unexamined Publication No.

59-67034). However, the bending directions of the bent lip portion 7 and the first seal portion 25 are different from each other (as shown by the blackish and whitish arrows of FIG. 1, respectively) when they are in contact with the door glass G. It is, therefore, undesirable to stick the bent lip portion 7 to the first seal portion 25, because the sealing property thereof is lowered by interference in the bending functions thereof.

SUMMARY OF THE INVENTION

The inventor of the present invention has made an investigation thoroughly to solve the aforementioned problems, and consequently, have hit the idea of using a corner piece for connecting the upper edge glass run 1 to the lower edge glass run inner 17. The idea has been developed into the present invention constructed as follows.

According to an aspect of the present invention, provided is a glass run connecting corner piece provided in a corner portion of a window frame where abutment is made between a glass run for an upper edge of the window frame and a glass run inner for a lower edge of the door frame for sealing an inner surface of the door glass, the glass run having a base portion fixed to the window frame, a hollow seal portion for sealing a circumferential edge of door glass, and a hollow bent portion for sealing an inner surface of the door glass and for forming a water escape of rainwater or the like together with the hollow seal portion, the glass run inner having another base portion fixed to the window frame, a first belt-like seal portion provided upright from an upper edge of the other base, and a second belt-like seal portion provided upright from a lower edge of the other base portion with a distance from the first seal so as to make it possible to form a water escape of rainwater or the like, the glass run connecting corner piece comprising a longitudinal portion having the same cross-sectional shape as that of the window frame upper edge glass run and being stuck to the window frame upper edge glass run with its axial line made coincident with that of the latter, and a transverse portion having the same cross-sectional shape as that of the window frame lower edge glass run inner and being stuck to the lower edge glass run inner with its axial line made coincident with that of the latter, the first seal portion in the transverse portion being connected to a side wall of the hollow bent portion in the longitudinal portion, the second seal portion in the transverse portion being connected to the hollow seal portion in the longitudinal portion, so that the water escape of the longitudinal portion is communicated with the water escape of the transverse portion.

According to another aspect of the present invention, provided is a glass run connecting corner piece provided in a corner portion of a window frame where abutment is made between a glass run for an upper edge of the window frame and a glass run inner for a lower edge of the door frame for sealing an inner surface of the door glass, the glass run having a base portion fixed to the window frame, a hollow seal portion for sealing a circumferential edge of door glass, and a bent lip portion for sealing an inner surface of the door glass and for forming a water escape of rainwater or the like together with the hollow seal portion, the glass run inner having another base portion fixed to the window frame, a first belt-like seal portion formed on an upper edge side of the other base, and a second seal portion having a belt-like lip portion provided upright at a hollow portion of the other base portion in a lower edge position than the first seal portion, the lip portion being lower in height than the first seal portion, the glass run connecting corner piece comprising a longitudinal portion having the same cross-sectional shape as that of the window frame upper edge glass run and being stuck to the window frame upper edge glass run with its axial line made coincident with that of the latter, a transverse portion having the same cross-sectional shape as that of the window frame lower edge glass run inner and being stuck to the lower edge glass run inner with its axial line made coincident with that of the latter, the bent lip portion in the longitudinal portion being connected to the lip portion of the second seal portion in the transverse portion, the water escape in the longitudinal portion being communicated with the hollow portion of the second seal portion in the transverse portion.

DETAILED DESCRIPTION OF THE PREFERRED EMBODIMENTS

Figure 1:
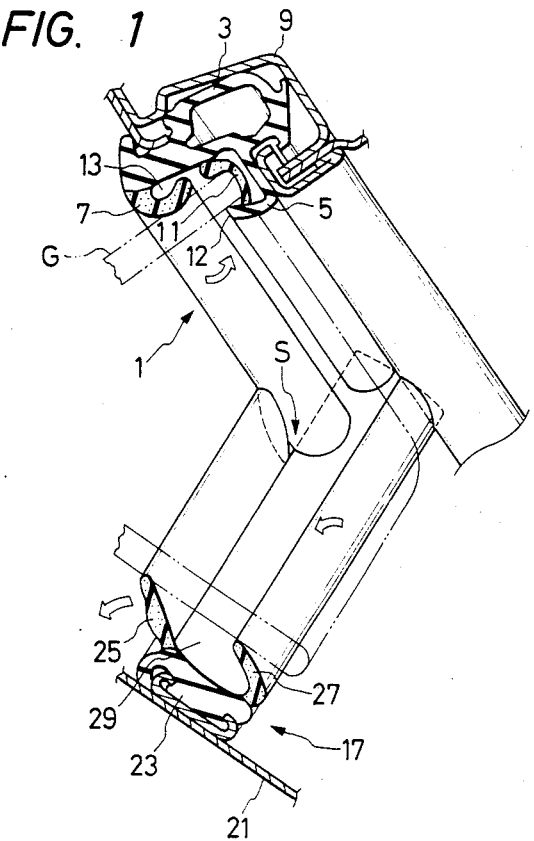
FIG. 1 is a perspective view showing a generally-applied connection structure between an upper edge glass run 1 and a lower edge glass run inner 17.
Figure 2:
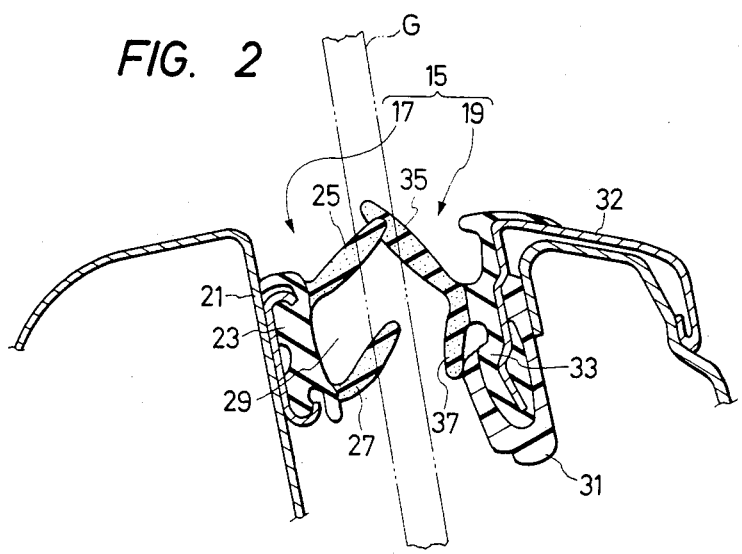
FIG. 2 is a sectional view showing a lower edge glass run 15 (composed of a lower edge glass run inner 17 and a lower edge glass run outer 19)
Figure 3:
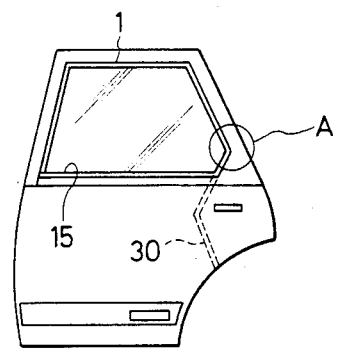
FIG. 3 is a front view of a door in vehicle.

The present invention will be described in more detail hereunder with reference to the drawings in which the parts corresponding to those in the drawings FIGS. 1, 2 and 3 are correspondingly referenced.

Figure 4:
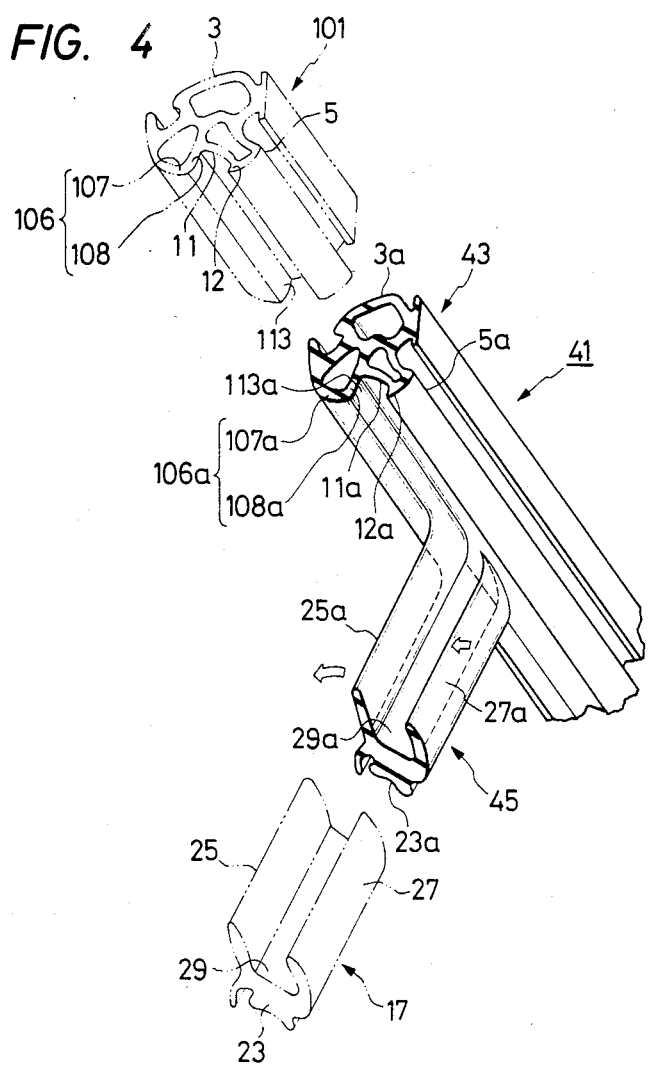
FIG. 4 is a perspective view of a corner piece 41 as a first embodiment according to the present invention.

FIG. 4 is a perspective view of a corner piece 41 according to the first embodiment of the present invention. The corner piece 41 is applied to a connection between the lower edge glass run inner 17 as described already for the generally-applied connection structure and an upper edge glass run 101 which is newly produced. The corner piece 41 comprises a longitudinal portion 43 and a transverse portion 45. The angle between the longitudinal portion 43 and the transverse portion 45 is established corresponding to the angle at the corner portion of a window frame. For example, in the drawing, the longitudinal portion 43 and the transverse portion 45 are made to be substantially perpendicular to each other.

The transverse portion 45 has the same cross-sectional shape as that of the lower edge glass run inner 17. More particularly, the transverse portion 45 has a base portion 23a, a first seal portion 25a and a second seal portion 27a which are formed to have the same cross-sectional shape as that of the lower edge glass run inner 17. Further, a water escape 29a is formed by the base portion 23a and the seal portions 25a and 27a.

The longitudinal portion 43 has the same cross-sectional shape as that of the upper edge glass run 101.

The upper edge glass run 101 has a hollow bent portion 106 formed by connecting a supporting wall 108 to the base portion 3 (in the vicinity of the seal portion 11). The supporting wall 108 is provided to extend from the free end of the bent lip portion 7 as defined above in the conventional art. A water escape 113 of rainwater or the like is formed by the hollow bent portion 106 and the hollow portion 5. The hollow bent portion 106 is provided to clamp the door glass G between the hollow bent portion 106 and the stopper wall 12 in the same manner as described above for the bent lip portion 7. However, the deformation of the hollow bent portion 106 is less than that of the bent lip portion 7, because the hollow bent portion 106 has the supporting wall 108. Also in the hollow bent portion 106, the clamping force with respect to the door glass G mainly depends on the elastic deformation of a side wall 107 (which corresponds to the bent lip portion). However, the deformation of the side wall 107 is limited by the supporting wall 108.

The aforementioned hollow bent portion 106 is used for the double purpose of improving the design of the upper edge glass run 101 and stabilizing the clamping force with respect to the door glass G by limination of the deformation.

In short, the longitudinal portion 43 has a base portion 3a, a hollow seal portion 5a (composed of a seal wall 11a and a stopper wall 12a), a hollow bent portion 106a (composed of a side wall 107a and a supporting wall 108a) and a water escape 113a, which are formed in the same cross-sectional shape as that of the upper edge glass run 101.

The first seal portion 25a of the transverse portion 45 is connected to the side wall 107a of the hollow bent portion 106a of the longitudinal portion 43. The first seal portion 25a and the side wall 107a are continuously shaped at the connection portion therebetween. As described above, the deformation of the hollow bent portion 106a being in contact with the door glass G is too little to prevent the first seal portion 25a from bending in the direction of the whitish arrow. Accordingly, the suction of indoor air is prevented and hence that the occurrence of wind whistling is prevented.

The second seal portion 27a of the transverse portion 45 is connected to the hollow portion 5a (seal portion 11a) of the longitudinal portion 43. By such connection, the bending of the second seal portion 17a in the direction of the whitish arrow is limited. However, there is no influence on the function of preventing the occurrence of wind whistling, because the sealing property of the first sealing portion 25a is secured as described above. Preferably, the height of the second seal portion 27a is gradually reduced at the connection portion between the second seal portion 27a and the hollow portion 5a.

Consequently, the water escape 113a of the longitudinal portion 43 can be continuously connected to the water escape 29a of the transverse portion 45.

The thus constructed corner piece 41 is formed by extruding a material (such as EPDM or the like) which can be connected both to the upper edge glass run 101 and to the lower edge glass run inner 17 by vulcanization adherence and which can give necessary elasticity respectively to the hollow bent portion 106a, the hollow seal portion 5a, the first seal portion 25a and the second seal portion 27a. The material is extruded between the upper edge glass run 101 and the lower edge glass run inner 17 inserted, so that the longitudinal portion 43 and the transverse portion 45 of the corner piece 41 are connected respectively to the upper edge glass run 101 and lower edge glass run inner 17 by vulcanization adherence in equal axes.

By the aforementioned procedure, the water escape 113 of the upper edge glass run 101, the water escape 113a of the longitudinal portion 43, the water escape 29a of the transverse portion 45 and the water escape 29 of the lower edge glass run inner 17 are connected successively and continuously. Further, the hollow bent portion 106 of the upper edge glass run 101, the hollow bent portion 106a of the longitudinal portion 43, the first seal portion 25a of the transverse portion 45 and the first seal portion 25 of the lower edge glass run inner 17 are connected successively and continuously. Accordingly, the suction of indoor air to the outside during running of the vehicle at a high speed can be prevented, so that the occurrence of wind whistling can be prevented. Furthermore, rainwater or the like exhausted from the water escapes 113 and 113a cannot penetrate the vehicle.

As described above, in the first embodiment of the present invention, provided is a glass run connecting corner piece (41) provided in a corner portion of a window frame where abutment is made between a glass run (101) for an upper edge of the window frame and a glass run inner (17) for a lower edge of the door frame for sealing an inner surface of the door glass, the glass run (101) being provided with a base portion (3) fixed to the window frame, a hollow seal portion (5) for sealing a circumferential edge of door glass, and a hollow bent portion (106) for sealing an inner surface of the door glass and for forming a water escape of rainwater or the like together with the hollow seal portion, the glass run inner (17) being provided with another base portion (23) fixed to the window frame, a first belt-like seal portion (25) provided upright from an upper edge of the other base, and a second belt-like seal portion (27) provided upright from a lower edge of the other base portion with a distance from the first seal so as to make it possible to form a water escape (29) of rainwater or the like, the glass run connecting corner piece (41) comprising a longitudinal portion (43) having the same cross-sectional shape as that of the window frame upper edge glass run (101) and being stuck to the window frame upper edge glass run (101) with its axial line made coincident with that of the latter, and a transverse portion (45) having the same cross-sectional shape as that of the window frame lower edge glass run inner (17) and being stuck to the lower edge glass run inner (17) with its axial line made coincident with that of the latter, the first seal portion (25) in the transverse portion being connected to a side wall (107a) of the hollow bent portion (106a) in the longitudinal portion (41), the second seal portion (27) in the transverse portion (45) being connected to the hollow seal portion (5a) in the longitudinal portion (43), so that the water escape (113a) of the longitudinal portion is communicated with the water escape (29a) of the transverse portion. Thus, the water escape (113) of the upper edge glass run is communicated with the water escape (29) of the lower edge glass run inner through the respective water escapes (113a, 29a) of the corner piece without any clearance. Accordingly, rainwater or the like to be exhausted from the water escapes cannot penetrate indoors. Further, the hollow bent portion (106) of the upper edge glass run can be connected to the first seal portion (25) of the lower edge glass run inner without any clearance through the hollow bent portion (106a) and the first seal portion (25a) of the corner piece. Accordingly, the suction of indoor air to the outside during running of the vehicle at a high speed can be prevented to hereby prevent the occurrence of wind whistling. Here, the elastic deformation of the hollow bent portion (106a) being in contact with the lower surface of the door glass is so small that the effect of elastic deformation cannot be suppressed even though the hollow bent portion (106) is connected to the first seal portion (25a). Accordingly, good sealing property can be obtained.

As described above, according to the first embodiment of the invention, the glass runs can be improved in the double function of preventing the occurrence of wind whistling and preventing the penetration of rainwater or the like into the vehicle.

In the following, a second embodiment of the invention will be described in detail.

Figure 5:
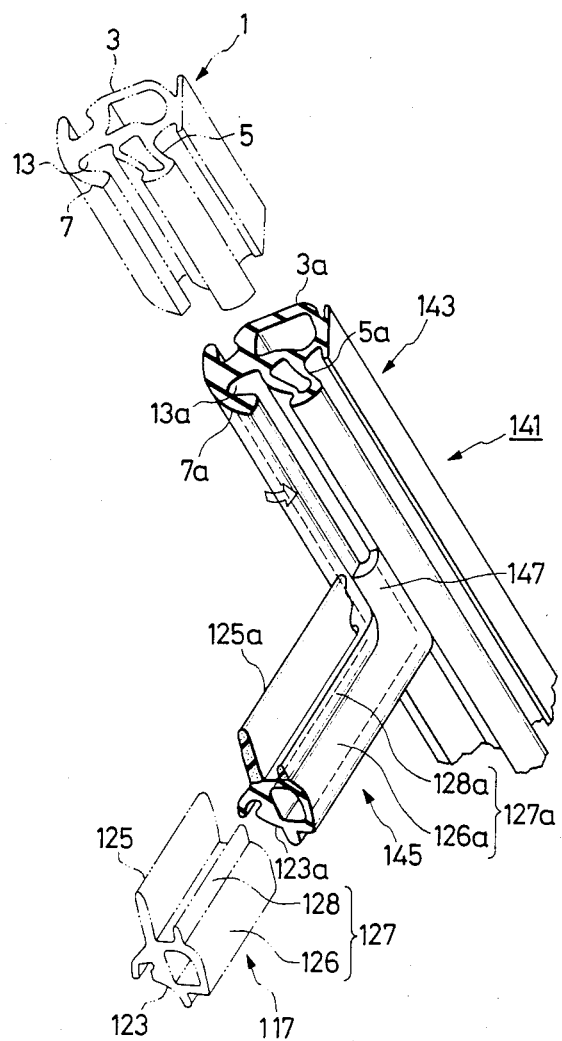
FIG. 5 is a perspective view of a corner piece 141 as a second embodiment according to the present invention.

FIG. 5 is a perspective view of a glass run connecting corner piece 141 as a second embodiment of the present invention. The corner piece 141 is applied to a connection between the upper edge glass run 1 as described already for the generally-applied connection structure and a lower edge glass run inner 117 which is newly produced. The corner piece 141 comprises a longitudinal portion 143 and a transverse portion 145. The angle between the longitudinal portion 143 and the transverse portion 145 is established corresponding to the angle at a corner portion of a window frame. For example, in the drawing, the longitudinal portion 143 and the transverse portion 145 are substantially perpendicular to each other.

The longitudinal portion 143 has the same cross-sectional shape as that of the upper edge glass run 1. More particularly, the longitudinal portion 143 has a base portion 3a, a hollow seal portion 5a and a bent lip portion 7a which are formed in the same cross-sectional shape as that of the upper edge glass run 1. The base portion 3a is protruded from the intersection of the longitudinal portion 143 and the transverse portion 145 corresponding to the window frame.

The transverse portion 145 has the same cross-sectional shape as that of the lower edge glass run inner 117. The lower edge glass run inner 117 has a base portion 123 fitted to the window frame, and first and second seal portions 125 and 127 coming into contact with the lower surface of the door glass G. The first seal portion 125 is a belt-like member as defined above in the conventional art, and is arranged in the upper edge of the base portion 123. The second seal portion 127 is arranged in the lower edge side than the first seal portion 125 and is composed of a hollow portion 126 and a lip portion 128. The lip portion 128 being in slide-contact with the lower surface of the door glass G is small in quantity of bending, because the lip portion is belt-like and is therefore relatively lower in height compared with the first seal portion. Accordingly, the sealing property of the second seal portion 127 is maintained by the elastic deformation (repulsive force due to distortion) of the hollow portion 126.

In short, the transverse portion 145 has a base portion 123a, a first seal portion 125a and a second seal portion 127a (composed of a hollow portion 126a and a lip portion 128a), which are formed in the same cross-sectional shape as that of the lower edge glass run inner 117.

The lip portion 128a of the transverse portion 145 is connected to the bent lip portion 7a of the longitudinal portion 143. The lip portion 128a and the bent lip portion 7a are continuously gradually shaped so that no stepped portion is formed at the connection portion therebetween. The lip portion 128a itself is little bent even though it comes into contact with the door glass G, so that the bending of the bent lip portion 7a in the direction of the whitish arrow cannot be prevented.

The base portion 123a of the transverse portion 145 is connected to the base portion 3a and the hollow seal portion 5a of the longitudinal portion 143. In other words, the hollow portion 126a is communicated with the water escape 13a of the longitudinal portion 13a, by cutting the upper surface of the hollow portion 126a. Preferably, a cover 147 may be provided over the water escape 13a of the longitudinal portion 141. By such an arrangement, the water escape 13a of the longitudinal portion 143 is connected to the hollow portion 126a of the transverse portion 145 without any clearance therebetween.

The thus arranged corner piece 141 is formed by extruding a material (such as EPDM or the like) which can be connected both to the upper edge glass run 1 and to the lower edge glass run inner 117 by vulcanization adherence and which can give necessary elasticity respectively to the bent lip portion 7a, the hollow seal portion 5a, the first seal portion 125a and the second seal portion 127a. The material is extruded between the upper edge glass run 1 and the lower edge glass run inner 117 inserted, so that the longitudinal portion 143 and the transverse portion 145 of the corner piece 141 are connected respectively to the upper edge glass run 1 and the lower edge glass run inner 117 by vulcanization adherence in equal axes.

By the aforementioned arrangement, the water escape 13 of the upper edge glass run 1, the water escape 13a of the longitudinal portion 143, the hollow portion 126a of the transverse portion 145 and the hollow portion 126 of the lower edge glass run inner 117 are communicated with one another without any clearance. Further, the bent lip portion 7 of the upper edge glass run 1, the bent lip portion 7a of the longitudinal portion 143, the lip portion 128a of the transverse portion 145 and the lip portion 128 of the lower edge glass run inner 117 are successively connected with any clearance. Accordingly, the suction of indoor air to the outside during running of the vehicle at a high speed can be prevented to thereby prevent the wind whistling from occurring. Furthermore, rainwater or the like exhausted from the water escapes 13 and 13a cannot penetrate the inside of the vehicle.

As described above, in the second embodiment of the present invention, provided is a glass run connecting corner piece (141) provided in a corner portion of a window frame where abutment is made between a glass run (1) for an upper edge of the window frame and a glass run inner (117) for a lower edge of the door frame for sealing an inner surface of the door glass, the glass run being provided with a base portion (3) fixed to the window frame, a hollow seal portion (5) for sealing a circumferential edge of door glass, and a bent lip portion (7) for sealing an inner surface of the door glass and for forming a water escape (13) of rainwater or the like together with the hollow seal portion (5), the glass run inner (117) being provided with another base portion (123) fixed to the window frame, a first belt-like seal portion (125) formed on an upper edge side of the other base (123), and a second seal portion (127) having a belt-like lip portion (128) provided upright at a hollow portion (126) of the other base portion (123) in a lower edge position than the first seal portion (125), the lip portion (128) being lower in height than the first seal portion (125), the glass run connecting corner piece (141) comprising a longitudinal portion (143) having the same cross-sectional shape as that of the window frame upper edge glass run and being stuck to the window frame upper edge glass run with its axial line made coincident with that of the latter, a transverse portion (145) having the same cross-sectional shape as that of the window frame lower edge glass run inner and being stuck to the lower edge glass run inner with its axial line made coincident with that of the latter, the bent lip portion (7a) in the longitudinal portion being connected to the lip portion (128a) of the second seal portion in the transverse portion, the water escape (13a) in the longitudinal portion being communicated with the hollow portion (126a) of the second seal portion in the transverse portion. Accordingly, the water escape (13) of the upper edge glass run can be communicated with no clearance with the hollow portion (126) of the lower edge glass run inner through the water escape (13a) and the hollow portion (126a) of the corner piece (141), so that rainwater or the like to be exhausted from the water escapes cannot penetrate the inside of the vehicle. Further, the bent lip portion (7) of the upper edge glass run can be connected with no clearance to the second seal portion (127) of the lower edge glass run inner through the bent lip portion (7a) and the second seal portion (127a) of the corner piece. Accordingly, the suction of indoor air to the outside during running of the vehicle at a high speed can be prevented, so that the occurrence of wind whistling can be prevented. Here, the elastic deformation of the second seal portion being in contact with the lower surface of the door glass is so little that the effect of elastic deformation cannot be suppressed even though the second seal portion is connected to the bent lip portion. Accordingly, good sealing property can be obtained.

As described above, in the second embodiment of the present invention, the glass runs can be improved in the double function of preventing the occurrence of wind whistling and preventing the penetration of rainwater or the like into the vehicle.

As described above, with the glass run connecting corner piece of the present invention, it is possible to effectively prevent occurrence of wind whistling and penetration of rainwater indoors during running of a vehicle.

What is claimed is:

1. A glass run connecting corner piece provided in a corner portion of a window frame for connecting a glass run for an upper edge of said window frame with a glass run inner for a lower edge of said door frame for sealing an inner surface of said door glass, said glass run having a base portion fixed to said window frame, a hollow seal portion for sealing a circumferential edge of door glass, and a hollow bent portion for sealing an inner surface of said door glass and for forming a water escape together with said hollow seal portion, said glass run inner having another base portion fixed to said window frame, a first belt-like seal portion provided upright from an upper edge of said other base, and a second belt-like seal portion provided upright from a lower edge of said other base portion with a distance from said first seal so as to form a water escape, said glass run connecting corner piece comprising:
a longitudinal portion having the same cross-sectional shape as that of said window frame upper edge glass run and being stuck to said window frame upper edge glass run with its axial line made coincident with that of the latter; and
a transverse portion having the same cross-sectional shape as that of said window frame lower edge glass run inner and being stuck to said lower edge glass run inner with its axial line made coincident with that of the latter;
wherein said first seal portion in said transverse portion is connected to a side wall of said hollow bent portion in said longitudinal portion, and wherein said second seal portion in said transverse portion is connected to said hollow seal portion in said longitudinal portion, so that said water escape of said longitudinal portion is communicated with said water escape of said transverse portion.

2. A glass run connection corner piece provided in a corner portion of a window frame for connecting a glass run for an upper edge of said window frame with a glass run inner for a lower edge of said door frame for sealing an inner surface of said door glass, said glass run having a base portion fixed to said window frame, a hollow seal portion for sealing a circumferential edge of door glass, and a bent lip portion for sealing an inner surface of said door glass and for forming a water escape together with said hollow seal portion, said glass run inner having another base portion fixed to said window frame, a first belt-like seal portion formed on an upper edge side of said other base, and a second seal portion having a belt-like lip portion provided upright at a hollow portion of said other base portion in a lower edge position than said first seal portion, said lip portion being lower in height than said first seal portion, said glass run connecting corner piece comprising:
a longitudinal portion having the same cross-sectional shape as that of said window frame upper edge glass run and being stuck to said window frame upper edge glass run with its axial line made coincident with that of the latter; and
a transverse portion having the same cross-sectional shape as that of said window frame lower edge glass run inner and being stuck to said lower edge glass run inner with its axial line made coincident with that of the latter;
wherein said bent lip portion in said longitudinal portion is connected to said lip portion of said second seal portion in said transverse portion, and said water escape in said longitudinal portion is communicated with said hollow portion of said second seal portion in said transverse portion.

3. A glass run corner arrangement provided in a corner portion of a window frame, comprising:
a glass run for an upper edge of said window frame, said glass run having a base portion fixed to said window frame, a hollow seal portion for sealing a circumferential edge of door glass, and a hollow bent portion for sealing an inner surface of said door glass and for forming a water escape of rainwater or the like together with said hollow seal portion;
a glass run inner for a lower edge of said door frame for sealing an inner surface of said door glass, said glass run inner having another base portion fixed to said window frame, a first belt-like seal portion provided upright from an upper edge of said other base, and a second belt-like seal portion provided upright from a lower edge of said other base portion with a distance from said first seal so as to form a water escape; and a corner piece for connecting said upper edge glass run with said lower edge glass run inner, said glass run connecting corner piece comprising:

a longitudinal portion having the same cross-sectional shape as that of said window frame upper edge glass run and being stuck to said window frame upper edge glass run with its axial line made coincident with that of the latter; and a transverse portion having the same cross-sectional shape as that of said window frame lower edge glass run inner and being stuck to said lower edge glass run inner with its axial line made coincident with that of the latter;

wherein said first seal portion in said transverse portion is connected to a side wall of said hollow bent portion in said longitudinal portion, and wherein said second seal portion in said transverse portion is connected to said hollow seal portion in said longitudinal portion, so that said water escape of said longitudinal portion is communicated with said water escape of said transverse portion.

4. A glass run corner arrangement provided in a corner portion of a window frame, comprising:

a glass run for an upper edge of said window frame, said glass run having a base portion fixed to said window frame, a hollow seal portion for sealing a circumferential edge of door glass, and a bent lip portion for sealing an inner surface of said door glass and for forming a water escape of rainwater or the like together with said hollow seal portion;

a glass run inner for a lower edge of said door frame for sealing an inner surface of said door glass, said glass run inner having another base portion fixed to said window frame, a first belt-like seal portion formed on an upper edge side of said other base, and a second seal portion having a belt-like lip portion provided upright at a hollow portion of said other base portion in a lower edge position than said first seal portion, said lip portion being lower in height than said first seal portion; and a corner piece for connecting said upper edge glass run with said lower edge glass run inner, said glass run connecting corner piece comprising:

a longitudinal portion having the same cross-sectional shape as that of said window frame upper edge glass run and being stuck to said window frame upper edge glass run with its axial line made coincident with that of the latter; and a transverse portion having the same cross-sectional shape as that of said window frame lower edge glass run inner and being stuck to said lower edge glass run inner with its axial line made coincident with that of the latter;

wherein said bent lip portion in said longitudinal portion is connected to said lip portion of said second seal portion in said transverse portion, and said water escape in said longitudinal portion is communicated with said hollow portion of said second seal portion in said transverse portion.

* * * * *